United States Patent [19]

Bohannon

[11] Patent Number: 4,752,794
[45] Date of Patent: Jun. 21, 1988

[54] CAMERA AND LIGHT GRIP ASSEMBLY

[76] Inventor: G. Michael Bohannon, 6940 S. Maplewood, Chicago, Ill. 60629

[21] Appl. No.: 101,784

[22] Filed: Sep. 28, 1987

[51] Int. Cl.$^4$ .................. G03B 15/03; G03B 17/00
[52] U.S. Cl. ........................... 354/126; 354/81; 354/145.1; 354/293; 362/11
[58] Field of Search ............. 354/81, 82, 126, 145.1, 354/293; 352/243; 362/3, 11

[56] References Cited

U.S. PATENT DOCUMENTS

| | | | |
|---|---|---|---|
| 3,852,788 | 12/1974 | Ueda | 354/293 |
| 3,893,145 | 7/1975 | King | 354/293 |
| 4,091,402 | 5/1978 | Siegel | 354/293 |
| 4,530,584 | 7/1985 | Schmidt | 354/293 |
| 4,710,005 | 12/1987 | Bennett | 354/145.1 |

Primary Examiner—A. A. Mathews
Attorney, Agent, or Firm—Basil E. Demeur; Robert E. Knechtel

[57] ABSTRACT

There is disclosed an improved camera and light grip combination, including a grip handle formed by a base, a grip portion upstanding from the base, the grip portion having an internal tubular chamber, a tubular member extending upwardly from the grip portion and having an internal tubular chamber in registry with the internal tubular chamber of the grip portion, and an elevator bar telescopically carried within the internal tubular chambers of the grip portion and tubular member, the base provided with a camera mount chamber formed therein and having disengageable lock means associated therewith, a camera mount formed by a mount bar for accepting a camera in disengageable engagement, and a lock tongue formed integrally with the mount bar and adapted for locking engagement with the camera mount chamber by disengageable lock means, and a universal head fixedly secured to the top end of the elevator bar, the universal head adapted to carry various camera accessories in disengageable engagement. There is also disclosed additional mountable accessory elements to be used in combination with the subject camera and light grip which permits the mounting of additional lights and accessories.

10 Claims, 4 Drawing Sheets

FIG. 10

CAMERA AND LIGHT GRIP ASSEMBLY

BACKGROUND OF THE INVENTION

Various types of camera holders and grips are presently available for the purpose of accommodating the disengageable mounting thereon of a camera. Generally, such handles or grips also include mounting positioans to carry lights, and other accessories.

Typically, however, such camera handles and/or grips only include a mounting point for a camera, and at best, a single camera light. A camera light is usually mounted onto the grip at a point spaced above the camera, and usually includes some type of holding means for holding the light cable in a fixed position such that activation of the camera will simultaneously activate the flash in order for a picture to be taken.

Of the camera grips and handles presently available, the only adjustment feature which is available for the flash light, is usually a vertically oriented adjustment such that the light may be moved along a vertical axis with respect to the camera. Furthermore, the typical light grip accepts a camera for mounting purposes by means of a threaded screw which is threaded through the mount portion of the grip, and into the bottom portion of the camera. Hence, to disconnect the camera from the grip requires that the screw be threadedly removed in order to remove the camera.

Heretofore, it has been impossible to utilize a variety of other camera accessories, such as umbrellas or the like, in conjunction with a portable camera grip, since the grips have no structure or other mechanisms available for holding accessory equipment. Hence, the portable camera grips which are presently available severely limit the operator in terms of the accessory equipment which may be utilized incident to the taking of photographs. In this connection, it is also well known that the presently available portable grips are also limited in terms of permitting the operator the availability of using a plurality of lights since the camera grips will only accept one light assembly in mountable fashion in conjunction with the camera. One of the difficulties which has been experienced is that the positioning of the light relative to the camera lense may cause conditions known as "red eye" which is a condition experienced where the light has been located too close to the lense, causing the eyes of a photographed subject to appear in a red color. Similarly, the positioning of the flash light relative to the lense is critical in terms of shading, since it may cause excessive darkness or cause the resulting pictures to have excessive light appearance.

Hence, it is deemed important to be able to accurately adjust the light relative to the lense in connection with a portable camera grip, since a great many photographs are in fact taken externally of a photographer's studio.

The present invention provides an improved camera and light grip combination, which not only permits the operator to employ multiple lights in connection therewith, but also permits the operator to mount a variety of camera accessory equipment for the purpose of improving the photographic capability of the operator.

OBJECTS AND ADVANTAGES

It is therefore a primary object of the present invention to provide a camera and light grip which is completely portable, while at the same time providing multiple mount points for a variety of camera accessories simultaneously.

In conjunction with the foregoing object, it is an object of the present invention to provide an improved camera and light grip combination formed by a grip handle having a base, a grip portion upstanding from the base, the grip portion having an internal tubular chamber, a tubular member extending upwardly from the grip portion and having an internal tubular chamber in registry with the internal tubular chamber of the grip portion, and an elevator bar telescopically carried within the internal tubular chambers of the grip portion and the tubular member, the base provided with a camera mount chamber formed therein and having disengageable lock means associated therewith, a camera mount formed by a mount bar for accepting a camera in disengageable engagement, a lock tongue formed integrally with the mount bar and adapted for locking engagement with the camera mount chamber by disengageable lock means, and a universal head fixedly secured to the top end of the elevator bar, the universal head adapted to carry various camera accessories in disengageable engagement.

In conjunction with the foregoing object, it is a further object of the invention to provide an improved camera and light grip combination as set forth above, wherein the mount chamber includes a recess formed therein and the lock means associated with the base comprising a pin chamber upstanding from the base, a lock pin carried within the pin chamber and extending through the mount chamber and having a lock washer fixedly secured to the lock pin and adapted to reciprocate within the recess of the mount chamber, and spring means associated with the lock pin for biasingly urging the lock pin and associated lock washer in an upward direction.

In conjunction with the foregoing objects, it is yet a further object of the invention to provide an improved camera and light grip combination of the type described wherein the lock tongue of the mount bar is bifurcated and includes an undercut portion along the lower surface thereof such that the bifurcated tongue, when inserted in the mount chamber, accommodates the lock pin therebetween and the lock washer rides into the undercut portion thereby to lockingly engage the mount bar in the mount chamber such that the entire camera and mount bar may be disengageably removed from the grip handle.

In conjunction with the foregoing objects, it is yet a further object of the invention to provide an improved camera and light grip combination as set forth, wherein the universal head includes mount rails for accommodating the mounting thereon of various camera accessories, and wherein the universal head further includes a mount aperture traversing the head to accommodate the additional mounting of other camera accessories simultaneously.

A further object of the present invention is to provide an improved camera and grip combination of the type described above, which further includes a universal arm formed by an elbow including mount means formed at one end thereof for permitting the mounting of the elbow to the universal head, and a pivotal arm pivotally mounted to the elbow at the opposed end thereof, the opposed end of the pivotal arm provided with mount rails for accommodating the mounting of additional camera accessories thereon, the pivotal arm adapted to move arcuately about the pivotal mounting point thereon.

A further object of the invention is to provide a combination camera and grip assembly of the type described which further includes a light grip, the light grip formed by a light carrying handle having fastening means carried thereon for fastening the light thereto, a lock plate positioned adjacent to the handle, the lock plate having a plurality of lock apertures formed therein and positioned about the periphery thereof, and a centrally positioned mount aperture, a mounting pin extending outwardly from the handle and through the mount aperture of the lock plate and adapted for lockingly engagement in the mount aperture of the universal head, the handle being rotatable about the mounting pin and further including a stop lug positioned for removable engagement in one of the lock apertures thereby to form a lock position, whereby a light may be fastened to the handle by the fastening means, and the handle rotatably positionable relative to the lock plate and locked into position by the stop lug engaging an appropriate lock aperture such that the light may be positioned in any desired rotated position.

Further features of the invention pertain to the particular arrangement of the parts whereby the above-outlined and additional operating features thereof are attained.

The invention, both as to its organization and method of operation, together with further objects and advantages thereof will best be understood by reference to the following specification taken in connection with the accompanying drawings.

BRIEF SUMMARY OF THE INVENTION

In summary, the present invention contemplates an improved camera and light grip assembly, which further incorporates additional accessory bars and fixtures whereby multiple camera accessories may be simultaneously mounted on the camera grip, while at the same time maintaining complete portability of the camera grip including the camera, and any and all of the accessories mounted thereon. The present invention contemplates the provision of a universal head on an elevator bar, the universal head having mount rails and as well as a mount aperture, such that attachments may be mounted to the mount rail and to the mount aperture simultaneously, thereby to accommodate a plurality of accessories thereon. The additional accessory bars and fixtures mount to either the primary universal head, or secondary universal heads of the accessory bars, such that the multiple fixtures may be attached carrying multiple accessories.

Furthermore, the camera and light grip of the present invention permits the employment of accessory fixtures which may hold camera lights, such that the lights may be positioned in any desired position relative to the camera lense, thereby to permit the operator to resolve any shadowing problems or "red eye" problems experienced as a result of having a fixed position light mount relative to the camera lense. Finally, the present invention also provides additional umbrella fixtures which permit the mounting of an umbrella onto the camera and light grip, simultaneously with multiple lights, whereby the beneficial photographic effects achieved by the use of the camera umbrella may be achieved while at the same time maintaining complete portability of the camera and light grip assembly.

DETAILED DESCRIPTION OF DRAWINGS

Figures 1, 2, 2A, 3A, 3B:
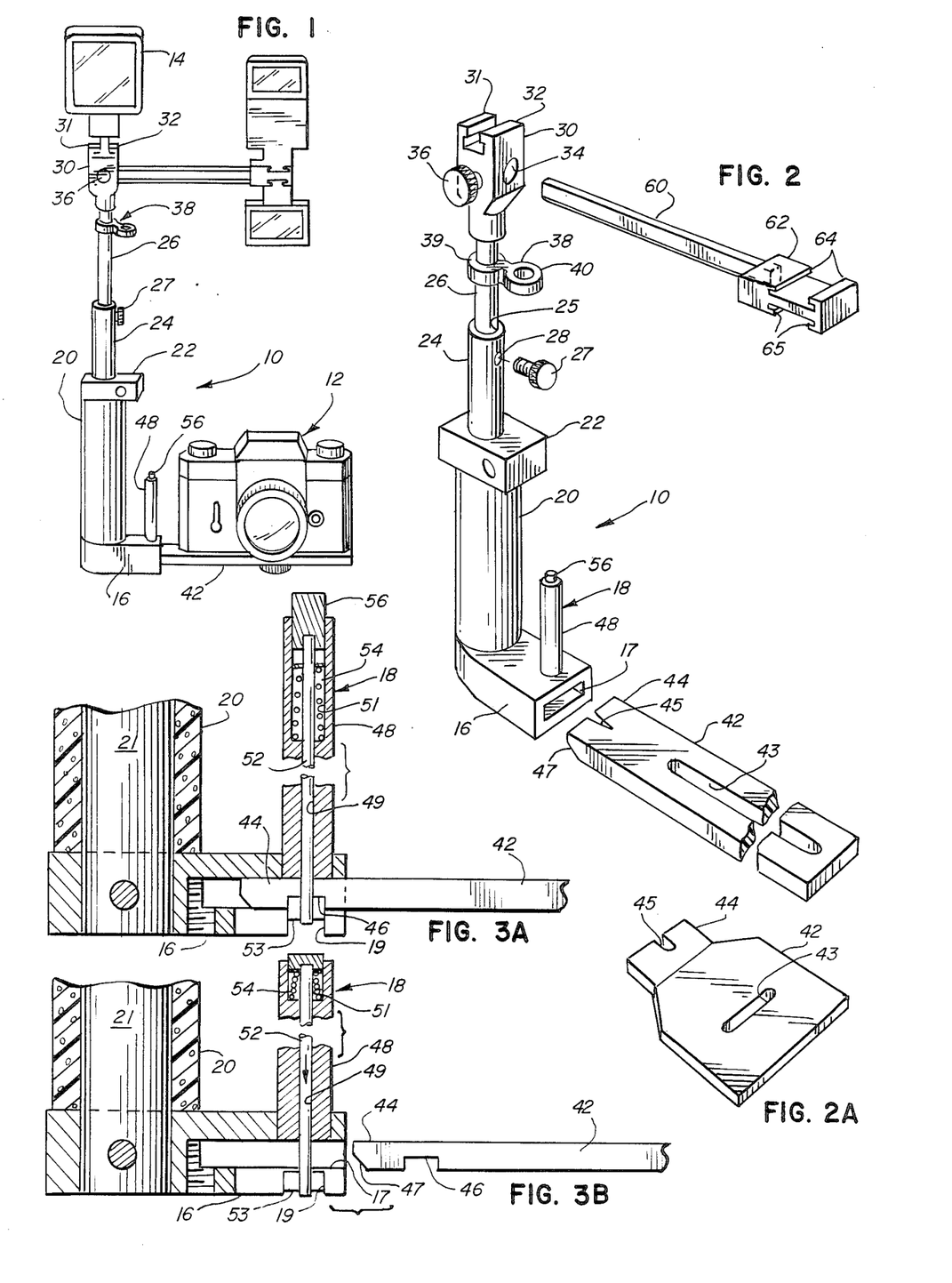
FIG. 1 is a front elevational view showing the combination camera and light grip of the present invention having a camera and plural lights mounted thereon.
FIG. 2 is a perspective view showing the subject camera and light grip, with the camera mount bar disengageably removed from the grip portions.
FIG. 2(a) is a perspective view showing an alternate configuration of a camera mount bar, which is a slightly different configuration allowing a larger platform base for supporting a camera thereon.
FIG. 3(a) is a side elevational view, partly broken away, and in cross section, showing the operation of the mounting of the mount bar within the base, and the operation of the disengageable lock means for lockingly engaging the mount bar within the camera mount chamber with the lock means in the lockingly engaged position.
FIG. 3(b) is a side elevational view, partly broken away, and in cross section, showing the disengageable lock means for the engagement of the mount bar within the camera mount chamber in the open position thereby to permit disengagement of the camera mount bar from the camera mount chamber.

As generally depicted in FIG. 1, the camera and light grip, generally referred to by the numeral 10, is shown to carry a camera 12, and a flash light 14. The camera and light grip 10 is generally formed by a base 16 which includes a camera mount chamber 17 positioned therein, and a lock mechanism 18 associated therewith. The camera and light grip 10 further includes a grip portion 20 upstanding from the base 16, which is provided with an internal tubular chamber 21. The upper portion of the grip portion 20 is shown to have a grip stop 22 fixedly secured thereon, which is provided with an aperture (not shown) in registry with the internal tubular chamber 21. The upper portion of the grip stop 22 carries a tubular member 24 extending upwardly therefrom, having an internal tubular chamber 25 in registry with the internal tubular chamber 21 of the grip portion 20.

An elevator bar 26 is shown to be telescopically positionable within the confines of the internal tubular chambers 21 and 25 respectively, such that the elevator bar 26 may be vertically reciprocated therein. A lock screw 27 is provided screw threadedly mounted in an appropriated lock aperture 28 which is positioned in the tubular member 24 such that the elevator bar 26 may be locked in any position as desired by the operator. The upper portion of the elevator bar 26 is shown to carry a universal head 30 which is fixedly secured thereon, and provided with a pair of opposed mounting rails 31 and 32 respectively. The universal head 30 is also shown to include a mounting aperture 34 which traverses the universal head 30 from end to end. A head lock screw 36 is provided in the universal head 30 which is carried in an aperture which intersects the mounting aperture 34 such that an accessory mounted within the mounting aperture 34 may be lockingly engaged in position. A cable clip 38 is provided, as more accurately depicted in FIG. 17 of the drawings, which is formed to include a closed mounting loop 39 for mounting the clip 38 onto the elevator bar 26, and an open cable enclosure 40 for accommodating flash light cable (not shown) therein. It will be apparent from FIGS. 1 and 2 of the drawings, that the cable clip 38 may be moved along the length of the elevator bar 26 to any desired position, depending upon the vertical positioning of the elevator bar 26 as reciprocated into or out of the internal tubular chambers 21 and 25 respectively.

As further shown in FIGS. 1, 2 and 3 of the drawings, the camera and light grip 10 of the present invention contemplates the provision of a camera mount bar 42, which in one embodiment of the invention includes a longitudinal centrally disposed slot 43 for disengageably mounting a camera 12 thereon. As is well known in the art, a camera 12 generally has a threaded aperture along the bottom portion thereof such that a camera 12 may be mounted onto any camera mount bar 42 by simply inserting a thumb screw upwardly from the bottom of the camera mount bar 42 upwardly into the threaded aperture provided in the camera 12. Such a threaded screw may be inserted through the longitudinal slot 43 thereby to fixedly secure the camera 12 to the camera mount bar 42. As is specifically shown in FIG. 3 of the drawings, the camera mount bar 42 is designed to lockingly engage within the camera mount chamber 17 of the base 16. Hence, the camera mount bar 42 is shown to include a bifurcated mounting end 44 containing a central slot 45, and a recess 46 provided along the underside of the bifurcated mount end 44.

The lock mechanism 18 is shown to include a pin housing 48 having a pin chamber 49 formed therein. The upper portion of the pin housing 48 includes a spring chamber 51 formed adjacent to top portion thereof. A lock pin 52 is carried within the confines of the pin chamber 49, and extends throughout the vertical extant thereof, terminating in a lock washer 53 mounted at the lower end thereof. It will also be observed that the camera mount chamber 17 includes a chamber recess 19 into which the lock washer 53 reciprocates. A spring 54 is provided within the confines of the spring chamber 51, and operates to normally biasingly urge the lock pin 52 in an upward direction such that the lock washer 53 is moved partially if not substantially out of the chamber recess 19.

It will be observed from a view of FIGS. 2 and 3 of the drawings, that the camera mount bar 42 may be lockingly engaged within the confines of the camera mount chamber 17 by inserting the bifurcated mount end 44 of the camera mount bar 42 into the camera mount chamber 17. It will further be noted that the bifurcated mount end 44 of the camera mount bar 42 includes a chamfered end 47 thereby being designed to ride up over the shoulder formed in the lock washer 53. Given the fact that the camera mount bar 42 includes a bifurcated mount end 44, the lock pin 52 will ride into the central slot 45 as the mount bar 42 is inserted into the mount chamber 17. The act of pushing the mount bar 42 into the chamber 17 will cause the lock pin 52 to move against the action of the spring 54 forcing the lock washer 53 down into the recess 19 until the bifurcated mount end 44 of the mount bar 42 is fully contained within the confines of the mount chamber 17. The action of the spring 54 will then cause the lock washer 53 to reciprocate upwardly until the lock washer 53 rests in the lower recess 46 formed in the underside of the mount bar 42, onto the grip portion of the camera and light grip 10. A finger button 56 is provided at the top end of the lock pin 52 such that the locking procedure may be reversed by simply depressing the finger button 56 to remove the lock washer 53 from the recess 46, thereby permitting the mount bar 42 to be retracted from the mount chamber 17. As shown in FIG. 2 of the drawings, the invention further contemplates the provision of an accessory bar 60 which is designed to mount within the mounting aperture 34 contained in the universal head 30. The accessory bar 60 is provided with an accessory head 62 which is formed to include a pair of upper and lower mount rails 64 and 65 respectively. The upper and lower mount rails 64 and 65 are designed and sized to accommodate standard camera accessories of the type presently available and as well known in the art. It will also be appreciated from a view of FIG. 2 that the accessory bar 60, once mounted within the mounting aperture 34 of the universal head 30 may be lockingly engaged in position by means of the head lock screw 36.

With respect to FIG. 2(a) of the drawings, an alternate form of a camera mount bar is illustrated. In this embodiment, the camera mount bar 42 is shown to have a wider configuration, and includes a longitudinal slot 43 which extends transversely of the mount bar 42. This permits the camera 12 to be engaged in a forwardly rearwardly changeable position rather than in a side to side configuration as shown with respect to the mount bar 42 in FIG. 2.

The construction of the mounting end of the mount bar 42 is similarly configured. There is provided a bifurcated mounting end 44 containing a central slot 45 with a recess (not shown) along the under side of the bifurcated mount end 44.

Figure 4:
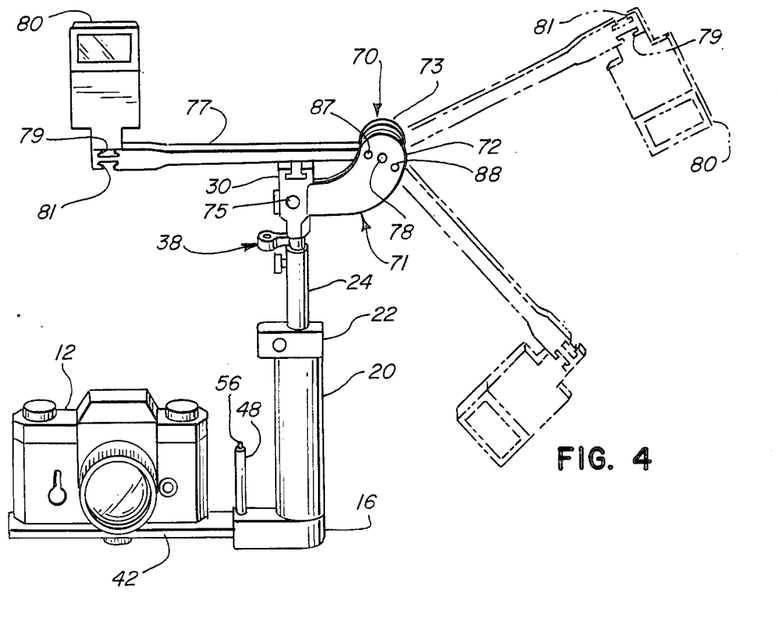
FIG. 4 is a front elevational view showing the camera and light grip combination of the present invention, and further including the addition of the universal arm mounted to the universal head of the grip portion, accommodating a mounting position for a light, and also showing in phantom the manner in which the pivotal arm may be rotated about the pivotal mounting thereof with respect to the universal elbow.
Figure 5:
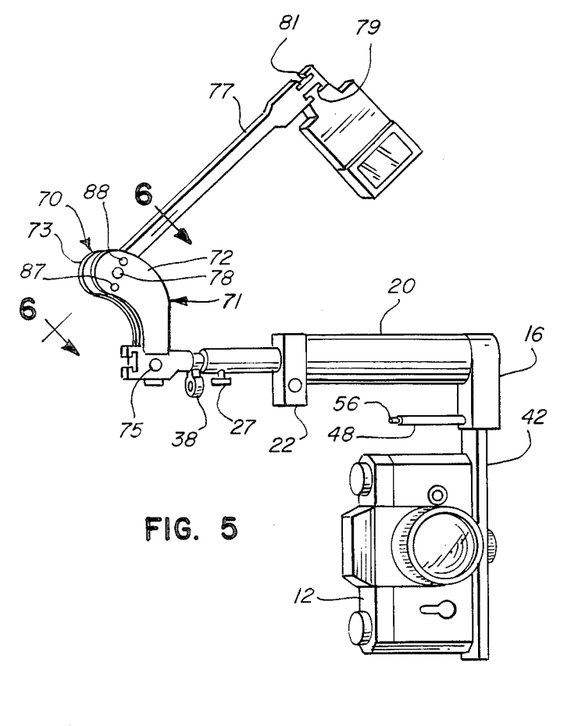
FIG. 5 is a front elevational view, showing the manner in which the camera and light grip combination of the present invention may be rotated for picture taking purposes, with the light assembly as mounted on the universal arm being rotated to a position in substantial vertical alignment with the camera lense despite the ninety (90°) degree rotation of the camera.
Figure 13:
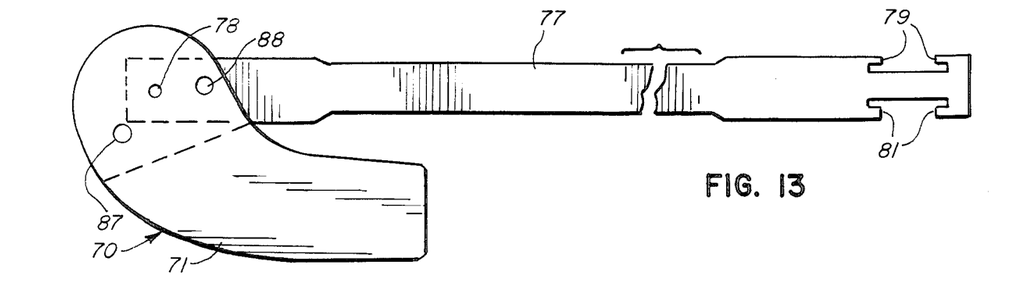
FIG. 13 is a side elevational view, partly in cross section and partly broken away, showing the construction of the universal arm, including the elbow portion and the pivotal arm portion thereof, the pivotal arm portion also including mount rails for accommodating the mounting of additional fixtures.

With respect to FIGS. 4, 5 and 13 of the drawings, the construction and mode of operation of the universal arm 70 of the present invention is illustrated. With specific reference to FIG. 13 of the drawings, it will be observed that the universal arm 70 includes an elbow portion 71 which is constructed by a pair of opposed elbow plates 72 and 73 respectively. The elbow plates 72 and 73 are spaced apart and include mount apertures (not shown) which accommodate the insertion of a mounting pin 75 therethrough. As will be observed in FIG. 4 of the drawings, the elbow portion 71 is mounted to the universal head 30 by inserting the mounting pin 75 through the mounting aperture 34 and securing the same in position. In this manner, the elbow portion 71 is securely mounted to the universal head 30.

The universal arm 70 is shown to further include a pivotal arm 77 which is pivotally secured to the elbow portion 71 by means of a pivot pin 78. The opposed end of the pivotal arm 77 is shown to be provided with a pair of upper and lower mount rails 79 and 81 respectively which accommodates the mounting thereon of a flash assembly 80 as illustrated in FIG. 4. The flash assembly 80 is of standard construction and includes a T-shaped mount which is sized to be accommodated by the upper and lower mount rails 79 and 81 as is well known in the art.

As is further shown in phantom in FIG. 4, the pivotal arm 77 is designed to pivotally and arcuately move about the pivot pin 78 such that the flash assembly 80 may be positioned as desired by the operator of the grip. The positioning of the flash assembly 80 has, of course, an impact upon the shading and light chracteristics of the subsequent picture which is taken since the light can be positioned in any desired position as illustrated.

Figure 6:
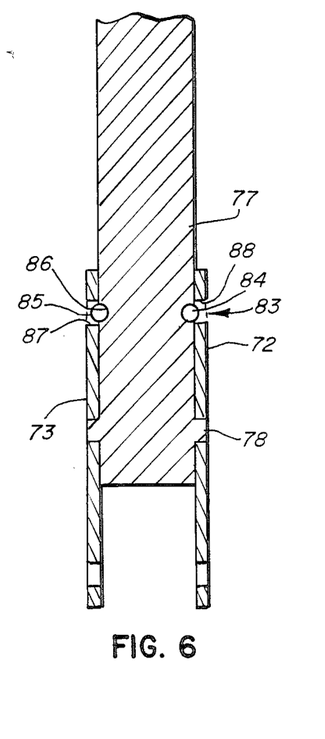
FIG. 6 is a side elevational view, in cross section, taken in the direction of the arrows along the lines 6—6 of FIG. 5, showing the manner in which the pivotal arm may be lockingly engaged with respect to the elbow portion of the universal arm.

As is more specifically shown in FIGS. 5 and 6 of the drawings, the universal arm 70 may be provided with a locking mechanism 83 to lockingly engage the pivotal arm in selected positions relative to the elbow portion 71. The locking mechanism 83 may be designed to include a pair of opposed lock balls 84 and 85 respectively, which are carried in the universal arm 77, and appropriate lock ball recesses 86 provided in the pivotal arm 77. The opposed elbow plates 72 and 73 respectively include a series of two lock apertures 87 and 88 respectively into which the lock balls 84 and 85 may lockingly engage. As shown in FIGS. 4 and 5 of the drawings, at least a series of two such lock apertures 87 and 88 may be provided at spaced locations in the elbow plates 72 and 73 respectively. It will be apparent that additional lock apertures may be provided such that a series of lock positions may be established for the pivotal arm 77 relative to the universal arm 70.

As shown in FIGS. 4 and 5 of the drawings, the upper and lower mount rails 79 and 81 respectively formed on the pivotal arm 77 are designed to accommodate a pair of flash assemblies 80, if desired. Hence, the light capacity of the camera and light grip 10 may be increased dramatically without sacrificing portability, or without dramatically increasing the overall weight characteristics of the portable grip 10.

Figures 7, 8, 9, 10:
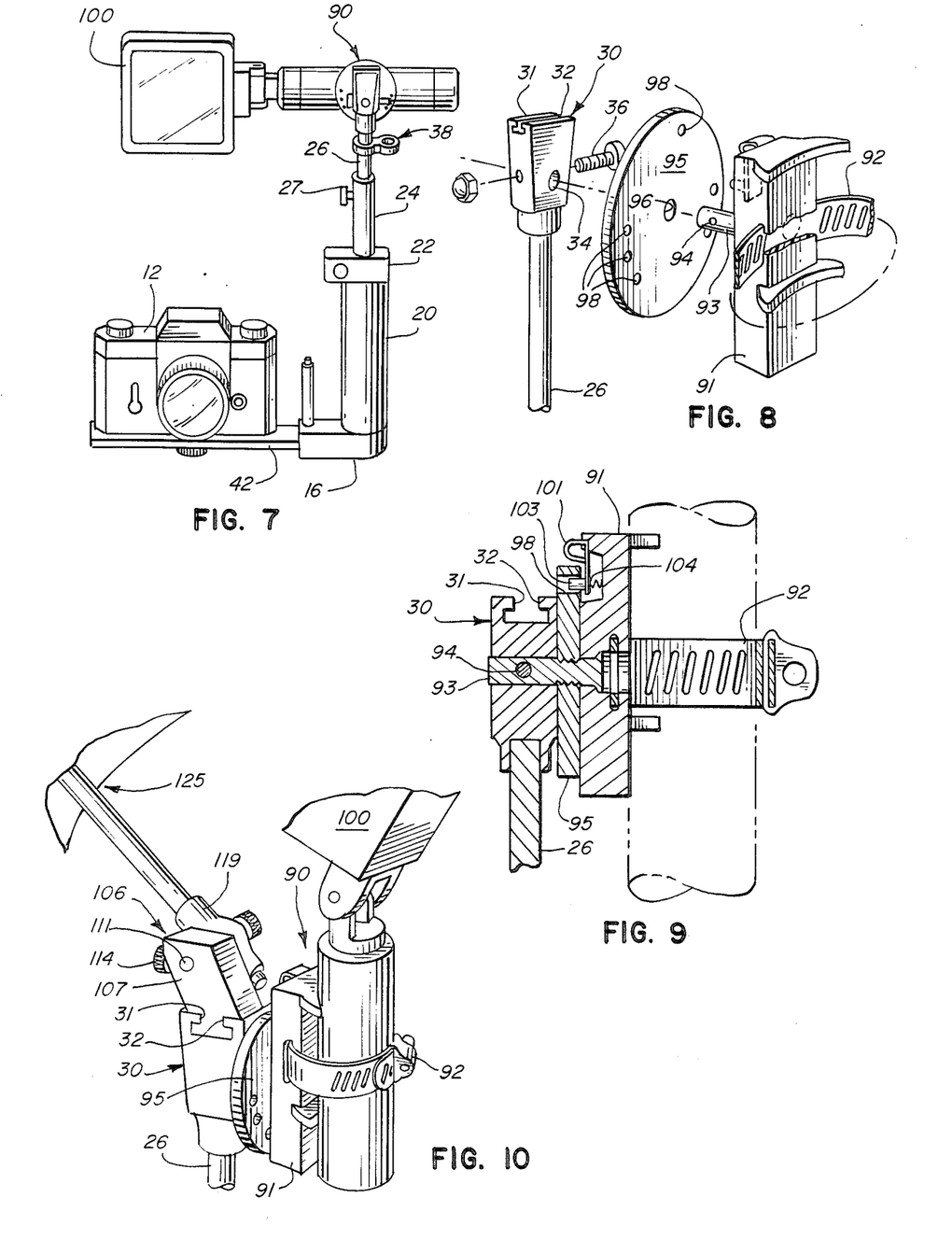
FIG. 7 is a front elevational view, showing the camera and light grip combination of the present invention and further including a light grip secured to the universal head of the elevator bar for accommodating the mounting of an alternate flash light assembly.
FIG. 8 is an exploded perspective view, showing the manner in which the light grip assembly is constructed, and also the manner in which the same mounts to the universal head of the elevator bar.
FIG. 9 is a side elevational view, in cross section, and partly broken away, showing the manner in which the light grip mounts to the universal head of the elevator bar.
FIG. 10 is a perspective view showing the light grip mounted to the universal head, and also showing additional camera accessories similarly mounted to the universal head of the elevator bar, simultaneously with the light grip assemblies.
Figure 11:
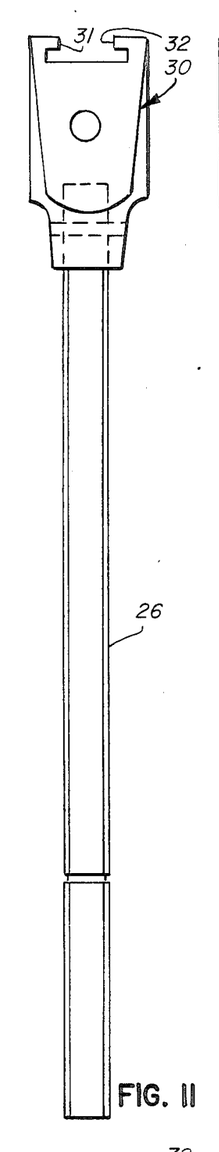
FIG. 11 is a front elevational view of the elevator bar carried within the tubular chambers of the grip portion and tubular member and having the universal head mounted on the upper end thereof.

With reference to FIGS. 7 through 10 of the drawings, an additional light accessory is illustrated. The light accessory consists of a light grip, generally indicated by the numeral 90, which includes a light carrying handle 91 having light fastening means 92 contained thereon. The light fastening means 92 may consist of any appropriate fastening means such as a lock band as illustrated in FIGS. 8, 9 and 10 of the drawings.

The handle 91 is provided with a mounting pin 93 extending radially outwardly from the rear portion thereof, the mounting pin 93 including a lock aperture 94 which, in use, will come into registry with the head lock screw 36 of the universal head 30 when mounted. As illustrated in FIG. 9, the mounting pin 93 is designed to be accommodated within the mounting aperture 34 of the universal head 30 such that the head lock screw 36 will pass through the lock aperture 94 and be locked into position.

The light grip assembly 90 further include a lock plate 95 which is formed with a central aperture 96 to accommodate the insertion therethrough of the mounting pin 93, and a series of stop holes 98 circumferentially disposed about the periphery thereof. The lock plate 95 is secured to the handle 91 by means of a press fit existing as between the mounting pin 93, and the central aperture 96 of the lock plate 95, as is more clearly shown in FIG. 9 of the drawings. It will also be observed that the light handle 91 includes a lock arm 101 having a lock stud 103 formed along the lower end thereof. As illustrated in FIG. 9, the lock stud 103 is biasingly urged forward by means of a coil spring 104 such that the operator may select an arcuate position for the light 100 by merely depressing the lock arm 101 and arcuately rotating the light handle 91 until a desired position for the light 100 is selected, after which the lock stud 103 will be permitted to pass into one of the stop holes 98 in the manner illustrated in FIG. 7.

It will also be apparent from FIGS. 8 and 9 of the drawings, that the entire light grip assembly 90 may be removed from the universal head 30 simply by disengaging the head lock screw 36 thereby to remove the mounting pin 93 from the universal head 30, and vice versa. It will also be appreciated that the mount rails 31 and 32 on the universal head 30 are still available to accommodate an additional light 14 as illustrated in FIG. 1, while nevertheless accommodating the positioning of the light grip assembly 90 thereon in order to expand the number of light assemblies carried by the camera and light grip 10 when in use.

An additional advantage of the light grip assembly 90 is the fact that the light 100 will be rotated within a tighter circumferential path than the path circumscribed when lights are employed on the universal arm 70 as illustrated in FIGS. 4 through 6 of the drawings. Hence, the operator is provided a broad range of alternatives in terms of light patterns when taking photographs away from the studio.

Figures 12, 14, 15, 16, 17:
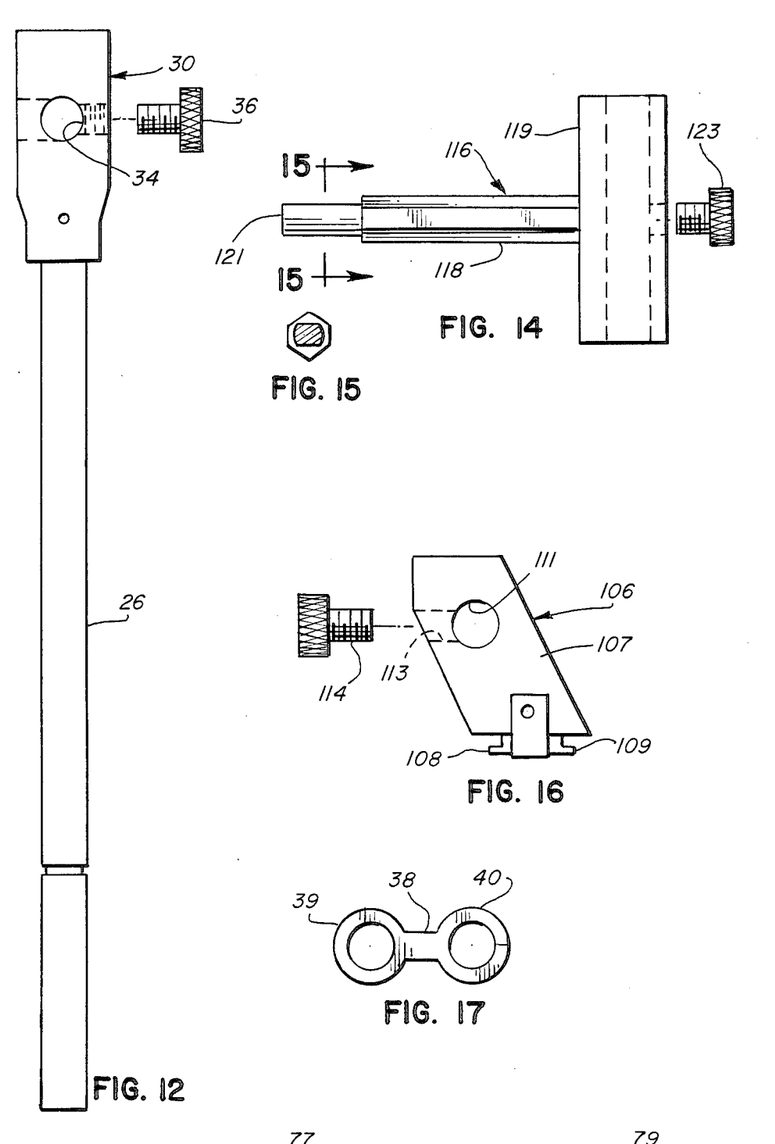
FIG. 12 is a side elevational view of the elevator bar shown FIG. 11, showing an accessory mount aperture positioned in the universal head for permitting additional camera accessories to be mounted thereon.
FIG. 14 is a side elevational view of an accessory T fixture for mounting on the universal head of the elevator bar and which accommodates the mounting of the accessory bar as shown in FIG. 11.
FIG. 15 is a side elevational view, taken in the direction of the arrows along the line 15—15 of FIG. 14, showing the mounting portion of the accessory fixture as shown in FIG. 14.
FIG. 16 is a side elevational view showing the umbrella attachment fixture for use in connection with the universal head of the elevator bar.
FIG. 17 is a cable clip suitable for mounting on the elevator bar for keeping the light cable in position on the camera and light grip.

In FIGS. 14 through 16 of the drawings, additional accessories are illustrated to accommodate the mounting onto the camera and light grip 10 of an umbrella assembly as is commonly known in the photographic art field. As shown in FIG. 16, there is provided an umbrella fixture 106 formed by a mounting block 107 having a pair of mounting rails 108 and 109 respectively carried at the bottom end thereof. As illustrated, the mounting rails 108 and 109 are sized and adapted to be accommodated within the mount rails 31 and 32 of the universal head 30 (see FIG. 10). The mounting block 107 is also shown to include a carrying aperture 111 and a transversally disposed threaded lock aperture 113 associated therewith. A threaded lock screw 114 for a purpose to be described hereinbelow.

In FIG. 14, the umbrella adaptor 116 is shown. The adaptor 116 is formed by a holding bar 118 which is completed with holding arm 119 disposed at one end, and a mounting post 121 disposed at its opposed end. As shown in FIG. 10 of the drawings, the umbrella fixture 106 is first mounted onto the universal head 30 by positioning the mounting rails 108 and 109 into the mount rails 31 and 32 respectively. The umbrella adaptor 116 may then be mounted to the umbrella fixture 106 by inserting the mounting post 121 into the carrying aperture 111 of the umbrella fixture 106. The mounting post 121 is securely held in position by means of screw threadedly threading the threaded lock screw 114 into the threaded lock aperture 113 until contact is made with the mounting post 121. The holding arm 119 is then designed to hold the umbrella 125 securely in position therein, and locked therein by means of a lock screw 123. As illustrated in FIG. 10 of the drawings, the umbrella 125 may be carried on the universal head 30 of the elevator bar 26, while simultaneously, the light grip assembly 90 may be similarly mounted to the universal head 30 via the mounting aperture 34 as previously described. Hence, it is possible to carry on the camera and light grip 10 both an umbrella 125 as well as a flash attachment such as the light 100 such that the operator is not deprived of any necessary accessory incident to the taking of pictures on a portable basis.

Indeed, any number of variations are permitted by virtue of the present invention given the various accessories which are now available for simultaneous mounting on the camera and light grip 10. For example, with reference to FIG. 2 of the drawings, the accessory bar 60 may be provided by mountingly engaging the same through the mounting aperture 34, such that a series of three mounting rails, 31, 32, and 64 and 65 respectively are provided. It will be appreciated that the umbrella fixture 106 may be mounted to any one of the pairs of mount rails 31, 32, 64 and 65 respectively, while lights may be carried in the remaining mount rails respectively.

Where the operator desires to produce photographs by moving a light relative to the lense, either the universal arm 70 may be employed, or the light grip assembly 90 may be employed, depending upon the size of the circumferential path of the light desired. As was indicated previously, when using the universal arm 70 attachment, a larger radial path of the light relative to the lense may be achieved, while a shorter radial path will be achieved by utilizing the light grip assembly 90.

If the operator desires to merely employ a series of three light flashes, then he would utilize the accessory bar 60 as mounted on the universal head 30 in order to accommodate three light fixtures. This configuration is shown in FIG. 1 of the drawings. As would be evident from FIG. 4 of the drawings, the operator may employ a double light flash assembly by utilizing the universal arm 70 and slidingly mounting a pair of flash assemblies 80 thereon. As shown in FIG. 10 of the drawings, a single flash light 100 may be employed in combination with the umbrella 125 which also affords the operator the ability to circumferentially move the light 100 in an arcuate path as previously described.

It will be appreciated from the above description, that the present invention provides an improved camera and light grip assembly which permits the operator a broad range of variations and adjustments with respect to the number of lights employed, the ability to utilize accessories such as umbrellas and the like, and to very closely simulate the same level of professional photography which may be achieved in a photographic studio, but while on location at places remote from the studio. Furthermore, and as was previously indicated, the camera 12 may be easily demounted from the grip, simply by removing the camera mount bar 42 from the base 16 in the manner previously described. In this manner, the camera equipment being employed on site may be changed quickly, while leaving the light and/or umbrella accessory fixedly secured in position on the grip 10. It will be appreciated that heretofore, it has been necessary to demount the camera from the base in order to change cameras where the operator has desired to change camera equipment during a shooting cycle. The present invention eliminates these problems, and permits the operator the equipment he may utilize on a quick and efficient basis.

While there has been described what is at present considered to be the further embodiment of the invention, it will be understood that various modifications may be made therein and it is intended to cover in the appended claims all such modifications as fall within the true spirit and scope of the invention.

I claim:

1. An improved camera and light grip comprising in combination, a grip handle formed by a base, a grip portion upstanding from said base, said grip portion having an internal tubular chamber, a tubular member extending upwardly from said grip portion and having an internal tubular chamber in registry with said internal tubular chamber of said grip portion, and an elevator bar telescopically carried within said internal tubular chambers of said grip portion and said tubular member, said base provided with a camera mount chamber formed therein and having disengageable lock means associated therewith, a camera mount formed by a mount bar for accepting a camera in disengageable engagement, and a lock tongue formed integrally with said mount bar and adapted for locking engagement with said camera mount chamber by said disengageable lock means, and a universal head fixedly secured to the top end of said elevator bar, said universal head adapted to carry various camera accessories in disengageable engagement.

2. The improved camera and light grip combination as set forth in claim 1 above, wherein said mount chamber includes a recess formed therein and said lock means associated with said base comprises a pin chamber upstanding from said base, a lock pin carried within said pin chamber and extending through said mount chamber and having a lock washer fixedly secured to said lock pin and adapted to reciprocate within said recess of said mount chamber, and spring means associated with said lock pin for biasingly urging said lock pin and associated lock washer in an upward direction.

3. The improved camera and light grip combination as set forth in claim 2 above, wherein said lock tongue of said mount bar is bifurcated and includes an undercut portion along the lower surface thereof, whereby said bifurcated tongue when inserted in said mount chamber, accommodates said lock pin therebetween and said lock washer rides into said undercut portion thereby to lockingly engage said mount bar in said mount chamber.

4. The improved camera and light grip combination as set forth in claim 1 above, wherein said tubular member includes lock means for locking said elevator bar in any desired raised position.

5. The improved camera and light grip combination as set forth in claim 1 above, wherein said universal head includes mount rails for accommodating the mounting thereon of various camera accessories.

6. The improved camera and light grip combination as set forth in claim 1 above, wherein said universal head further includes a mount aperture traversing said head.

7. The improved camera and light grip combination as set forth in claim 6 above, which further includes an accessory bar having one end for mounting within said mount aperture traversing said head, and an opposed end having a pair of mount rails formed thereon for accommodating the mounting of various camera accessories thereon.

8. The improved camera and light grip combination asset forth in claim 1 above, which further includes a universal arm formed by an elbow including mount means formed at one end thereof for permitting the mounting of said elbow to said universal head, and a pivotal arm pivotally mounted to said elbow at the opposed end thereof, the opposed end of said pivotal arm provided with mount rails for accommodating the mounting thereon of various camera accessories, said pivotal arm adapted to arcuately move about the pivotal mounting point thereon.

9. The improved camera and light grip combination as set forth in claim 6 above, which further includes a light grip, said light grip formed by a light carrying handle having fastening means carried thereon for fastening a light thereon, a lock plate positioned adjacent said handle, said lock plate having a plurality of lock apertures formed therein and positioned about the periphery thereof, and a centrally positioned mount aperture, a mounting pin extending outwardly from said handle and through said mount aperture of said lock plate, and adapted for locking engagement in said mount aperture of said universal head, said handle being rotatable about said mounting pin and further including a stop lug positioned for removable engagement in one of said lock apertures thereby to form a lock position whereby a light may be fastened to said handle by said fastening means and said handle being rotatably positionable relative to said lock plate and locked into position by engaging said stop lug in an appropriate lock aperture such that the light may be positioned in any desired rotated position.

10. The improved camera and light grip combination as set forth in claim 9 above, wherein said stop lug includes spring means for biasingly urging said stop lug into the normal lock position with said stop lug protruding through a corresponding lock aperture.

* * * * *